J. F. BARRETT.
Harvester Cutter.

No. 14,898.  Patented May 13, 1856.

UNITED STATES PATENT OFFICE.

JONATHAN F. BARRETT, OF NORTH GRANVILLE, NEW YORK, ASSIGNOR TO ABRAM B. BARRETT AND JONATHAN R. BARRETT, OF LINCOLN, N. C.

IMPROVEMENT IN MOWING-MACHINES.

Specification forming part of Letters Patent No. 14,898, dated May 13, 1856.

*To all whom it may concern:*

Be it known that I, JONATHAN F. BARRETT, of North Granville, in the county of Washington and State of New York, have invented a new and useful Improvement in Mowing-Machines; and I do hereby declare that the following is a full, clear, and exact description of the construction and operation of the same, reference being had to the annexed drawings, forming part of this specification, in which—

Figure 1:
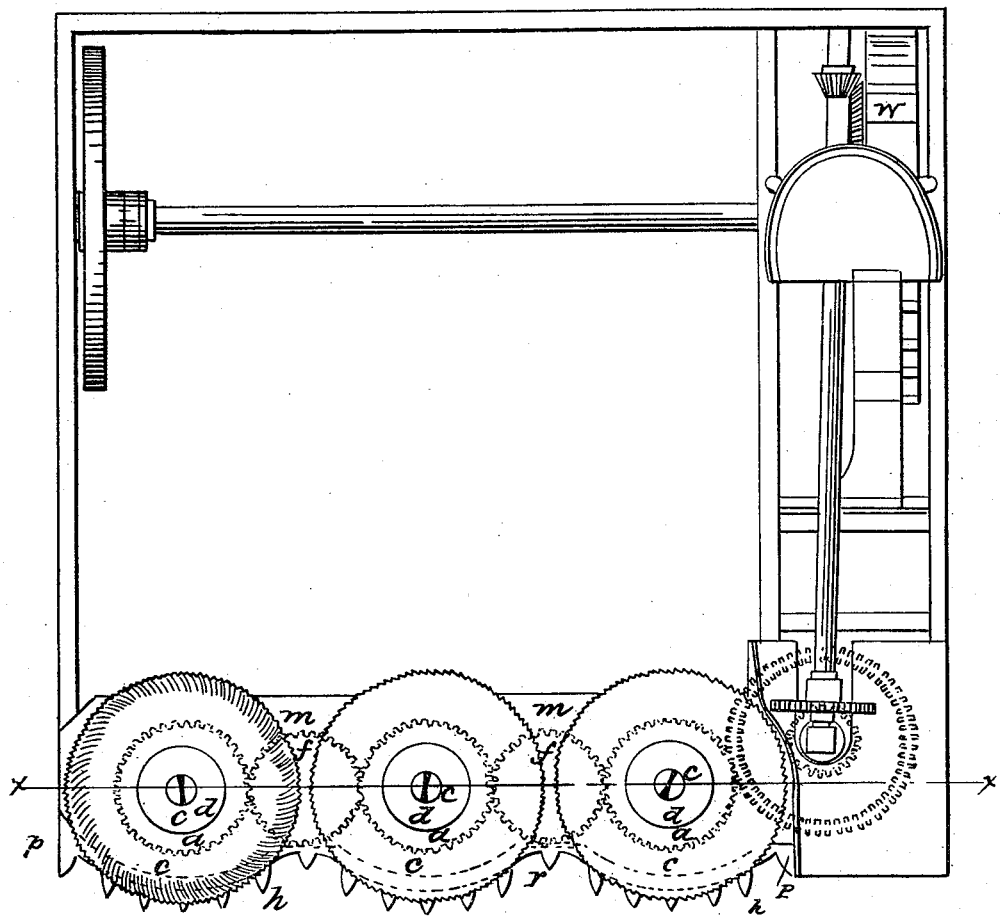
Figure 2:
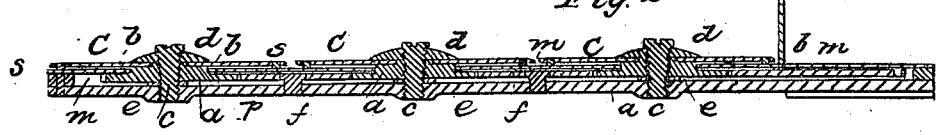
Figure 3:
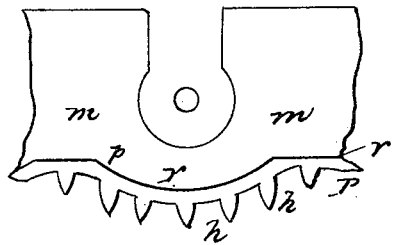

Figure 1 is a top view of the harvester. Fig. 2 is a vertical section on line $x\,x$ of Fig. 1. Fig. 3 is a top view of gearing guard-plate $m$.

The same letters of reference denote the same part of the machine.

The invention here considered refers to those mowing-machines in which rotary cutters, either with saw or sickle edges, are used. The great difficulty with this species of cutter has been the clogging of the driving mechanism with the cut product.

To obviate this defect is the object my invention, which consists in constructing above the guard-bar, to which the spindles of the driving and saw pinions are secured at a distance slightly greater than the thickness of said pinions, a covering fitting closely to the front of the guard-bar and passing between the saws and their pinions, close to their connections, and forming thereby a close chamber beneath the saws for the gearing driving the rotary cutters, and, in connection with said gear-covering, studs on the lower surfaces of the saws and reaching to the upper surface of the gear-covering are employed to convey to the rear of the cutter-bar any grass which may enter beneath the saws. The details of construction and operation are as follows:

In the drawings, C C C are the cutters, with either saw or sickle edges, each firmly secured to a pinion, $a$, so as to leave a space, $b$, between the upper face of the pinion and lower face of the saw. These cutters are attached to the guard-plate P by bolts $c$ passing through the connections $d$ of saw and pinion, the pinion being raised above the surface of the guard bar or plate P by the washer $e$. The driving-pinions $f$, connecting the saw-pinions, are also movable around spindles secured to the guard-plate P. The front of the guard P conforms to the shape of the saws, and is furnished with teeth $h$. Behind these teeth the guard is so formed as to consist of a rim, $r$, inclosing the space occupied by the gearing. Fitting against this rim, and passing between the saws and their pinions, close to the saw and pinion connection, is the covering-plate $m$, forming the top of the chamber occupied by the driving mechanism, and effectually excluding the cut product therefrom. The lower surfaces of the saws, near their edges, are provided with studs $s$, extending to the plate $m$, so as to catch and deliver over the rear of the plate anything which might enter between the saws and the said plate.

Motion is communicated to the gearing in the close chamber from the driving-wheel W, as is shown in Fig. 1, and the rotation of the cutters is effected without the possibility of any foreign matter reaching the cutter-gearing.

I make no claim to the rotary cutters, nor to the gearing driving them; but

What I do claim is—

The herein-described combination of guard-plate P, covering-plate $m$, and saw-connection to pinion, whereby the driving mechanism is effectually excluded from foreign matter, substantially as set forth.

In testimony whereof I have hereunto signed my name before two subscribing witnesses.

JONATHAN F. BARRETT.

Witnesses:
GEO. PATTEN,
JOHN S. HOLLINGSHEAD.